INVENTOR.
PERRY D. SEBRING

BY

Herschel C. Omohundro
ATTORNEY

July 21, 1970  P. D. SEBRING  3,521,505

TRANSMISSION MEANS

Filed July 9, 1968  4 Sheets-Sheet 2

INVENTOR.
PERRY D. SEBRING

BY Herschel C. Omohundro

ATTORNEY

INVENTOR.
PERRY D. SEBRING
BY
Herschel C. Omohundro
ATTORNEY

United States Patent Office

3,521,505
Patented July 21, 1970

3,521,505
TRANSMISSION MEANS
Perry D. Sebring, Phoenix, Ariz., assignor to The Garrett Corporation, Los Angeles, Calif., a corporation of California
Filed July 9, 1968, Ser. No. 743,456
Int. Cl. F16h 3/44; F02c 7/26; F02d 43/24
U.S. Cl. 74—785                    15 Claims

ABSTRACT OF THE DISCLOSURE

The subject transmission means is particularly adaptable to starters for gas turbine engines in which a power source, such as a fluid turbine, applies high-speed, low-torgue rotary movement which is converted by the transmission to relatively low-speed, high-torque motion and transmitted through an output member to the engine. The transmission has means to permit the engine to drive the output member after engine operation becomes self-sustaining at a speed in excess of the starting speed. Such means includes a pawl and ratchet mechanism to limit rotation of one element of the transmission to a single direction and permits free overrunning movement thereof when the engine drives the output member in excess of a predetermined speed. The mechanism also permits a windmilling engine to be started in flight without deleteriously affecting the engine, the starter, or components thereof. The transmission is useful also in a constant speed drive and starter mechanism in which a part is held stationary during the engine starting phase and permitted to revolve in the constant speed driving phase.

SUMMARY

This invention relates generally to motion-transmitting apparatus and more particularly to a transmission means for use in combination with starters for engines of the jet turbine type. Still more particularly, the invention is directed to an improvement in such transmission means which will simplify the construction, eliminate parts, reduce service requirements, cut costs, and make the operation more dependable.

In some instances, particularly in jet engine driven aircraft, means are provided for the dual purpose of initiating the operation of an engine and then, after the engine operation becomes self-sustaining, to transmit power from the engine to an accessory to effect its operation. The accessory, in some installations, may be an alternator or other electric generator which must be driven at a substantially constant speed and the transmission cooperates with the engine starter to adjust or modulate the rotary motion to compensate for variations in engine speed. In another instance, it has been found desirable to utilize the starter and transmission to drive the accessories for test or other purposes when the main engine of the aircraft is not in operation. An object of this invention is to provide a transmission means with mechanism which is automatically operative to hold a component part thereof stationary during a certain stage of use and to permit free rotation during a different stage.

Another object is to provide a transmission means with a one-way brake which is operative when the starter turbine is in use to hold a particular element of the transmission stationary whereby other elements may react to impart torque to and through the transmission to an output member which has a driving connection with the engine to be started, the one-way brake permitting the output member to drive predetermined parts of the transmission with a minimum of resistance and wear after the engine attains a predetermined rate of operation.

A further object is to provide a transmission having a gear supported for rotation within a ring which is secured to a stationary support, the ring having an annular row of ratchet teeth and the gear being provided with a plurality of pawl members pivoted for movement in one direction to engage the ratchet teeth to prevent rotation of the gear in one direction and centrifugal means for disengaging the pawls from the ratchet teeth to permit the gear to rotate or overrun after the engine starting operation has been completed. Such disengagement eliminates excessive wear, noise and other undesirable features of operation. If the engine operation should be interrupted or reduced in rate below a predetermined figure, re-engagement of the pawls with the ratchet teeth will take place and a new starting operation can be initiated. With this arrangement, the starter power unit can be energized while the engine is operating at a speed under the self-sustaining rate and the re-engagement of the pawls and ratchet will occur when the rates of operation of the engine and starter power unit become substantially equal. This feature reduces the wear and tear on the components and preserves the life thereof.

A still further object of the invention is to provide a transmission particularly suitable for a constant speed drive and engine starting mechanism of the type shown in Pats. 2,908,189 and 3,362,256. In such mechanism, a doube planetary gear system is provided and the carrier for the planet gears is connected for operation with the engine shaft. Two ring gear elements are carried by one part of the transmission and a complicated brake mechanism is employed to hold the ring gear elements stationary during the engine starting phase. The invention herein performs the same function but eliminates many brake parts, cones, actuators, valves, and other controls, and provides more flexibility. The parts will wear longer since friction surfaces are eliminated and no special service will be required.

Other objects and advantages will become apparent from a perusal of the following description of forms of the invention illustrated in detail in the accompanying drawings.

THE DRAWINGS

Figure 1:
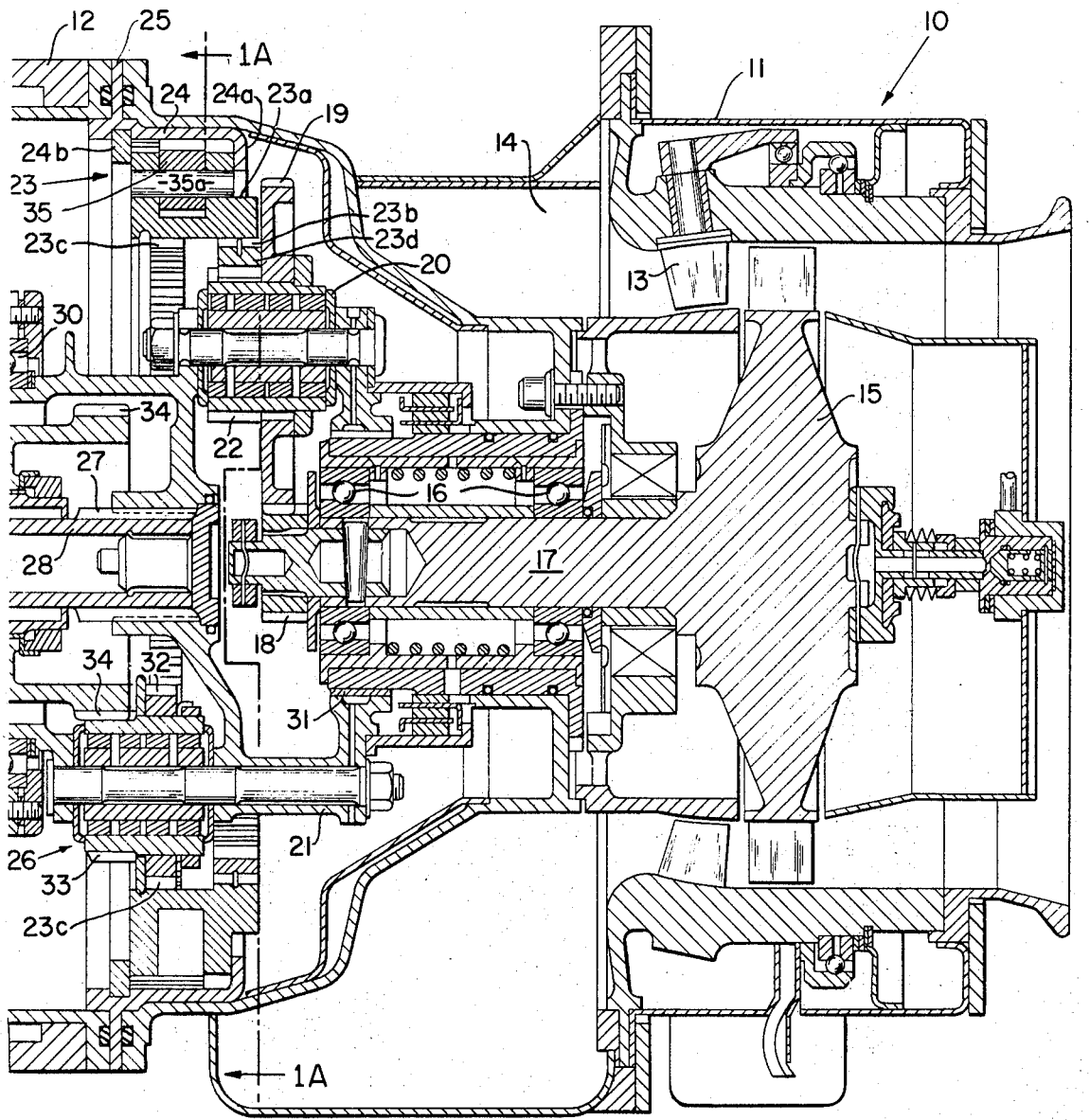
FIG. 1 is an axial sectional view taken through a portion of a constant speed drive and starter mechanism in which the invention has been incorporated.
Figure 1A:
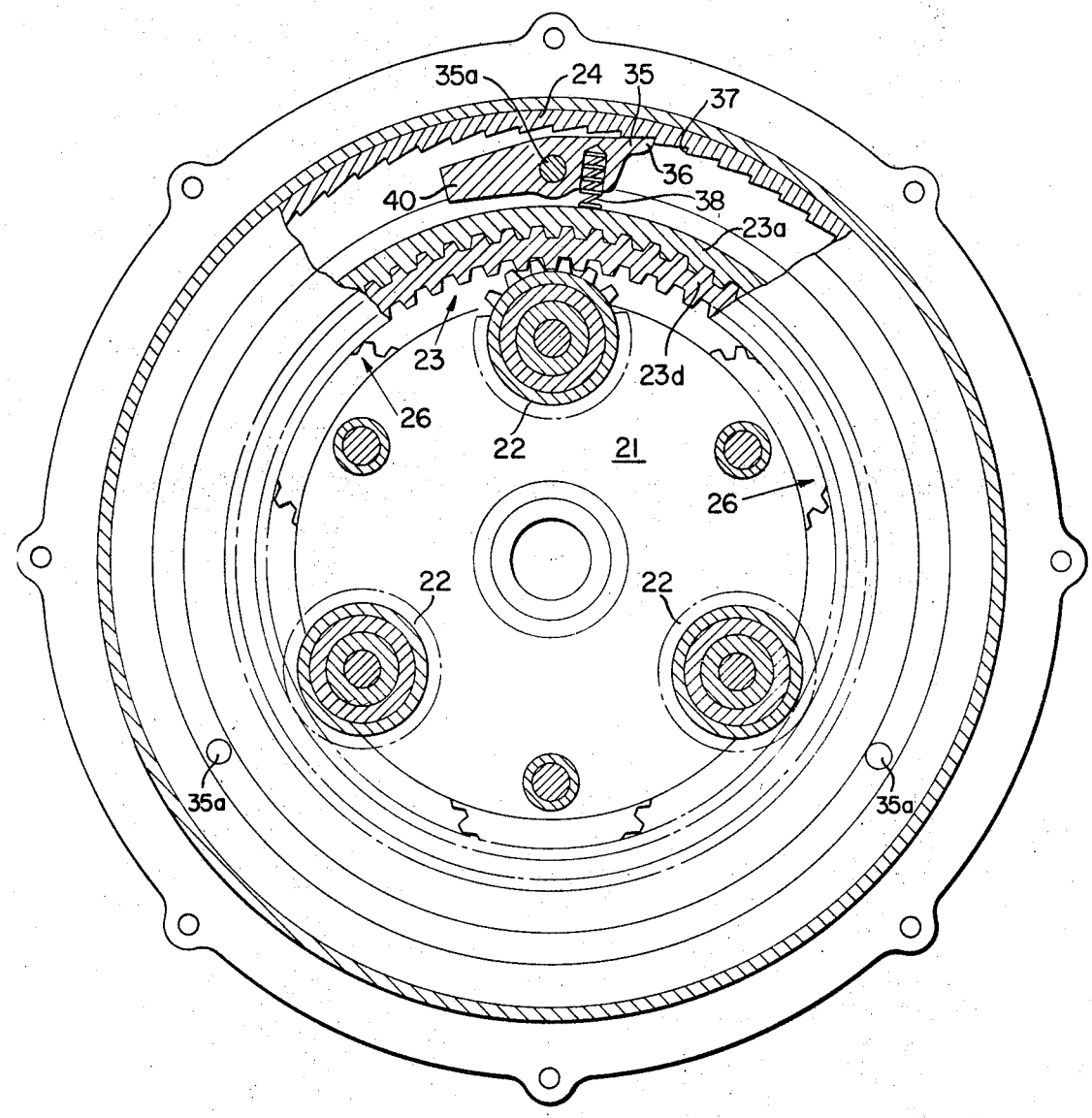
FIG. 1A is a vertical transverse sectional view taken through the constant speed drive and starter mechanism of FIG. 1 on the staggered line IA—IA of that figure.
Figure 2:
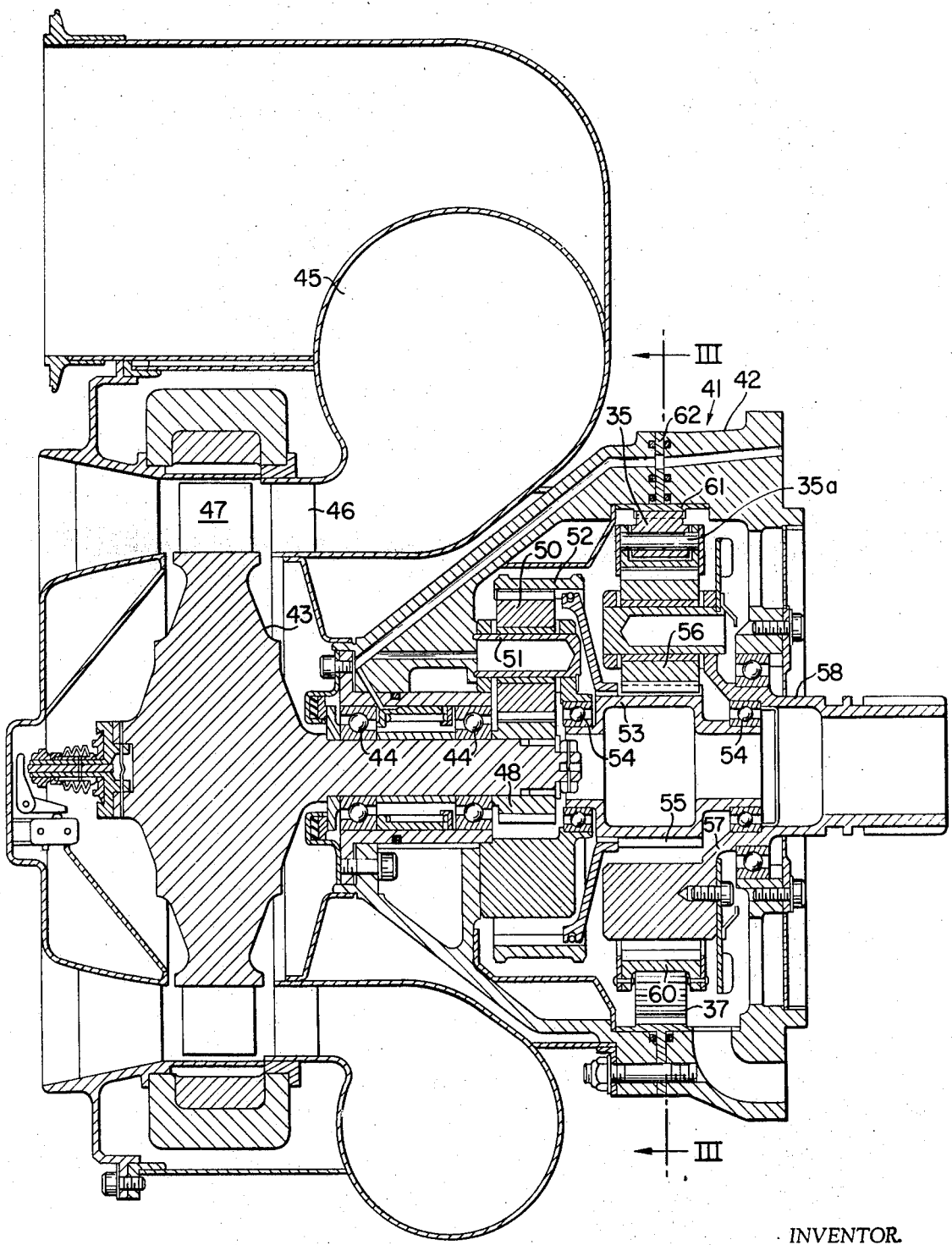
FIG. 2 is an axial sectional view of an air turbine starter embodying a transmission constructed in accordance with the present invention.

FIGS. 1 and 2 of the drawings show two adaptations of the invention. In FIG. 1, the invention is applied to a constant speed drive and starter mechanism used in aircraft or other applications where it is necessary to start an engine and then modify power supplied by the engine to drive an alternator or other device which it is required to operate at a constant speed, even though the engine speed may vary. Such mechanism has been shown in the patents mentioned previously.

A mechanism of this type includes a motor (in this instance, an air turbine) designated generally in FIG. 1 by the numeral 10. This motor is mounted in a casing 11 which is attached to the housing 12 of a transmission. The transmission housing is, in turn, secured to the housing of an alternator (not shown). Suitable transmission means are provided in casing 12, together with speed sensors (not shown), for gauging the speed of the alternator and operating control mechanism to discontinue the starting operation of the motor when a self-sustaining engine speed has been reached. Such mechanism will also initiate an engine starting operation of the motor in the event the engine speed drops below a predetermined rate. The control mechanism also serves to effect the adjustment of inlet vanes 13 provided in the air or other fluid passage 14 which supplies the motor 10 to effect its operation. The adjustment of the vanes 13 controls the speed of operation of the motor to compensate for variations in engine speed and maintain the rate of rotation of the alternator constant.

The motor 10 includes a turbine wheel 15 supported for rotation in spaced bearings 16, the shaft 17 of the turbine being provided at one end with a pinion 18 in meshing engagement with a spur gear 19 of one set of planet gears 20. The planet gears 20 are mounted for rotary movement in a carrier 21. Another spur gear 22 in the set 20 meshes with teeth of a ring gear assembly 23. This ring gear assembly, in the form of the device selected for illustration, includes an annular member 23a with two rows 23b and 23c of internal gear teeth. A ring 23d with outer and inner gear teeth is secured to the first row 23b of gear teeth, the outer and inner gear teeth serving as splines. Suitable means, such as a snap ring, locks the ring 23d to the annular member 23a which is supported for rotary movement in a ratchet ring 24 rigidly secured between motor casing 11 and transmission housing 12. The ratchet ring has a flange 25 projecting between the casing and housing 12 to retain it in place. The ratchet ring 24 is formed with an inner flange 24a to assist in locating the ring gear assembly. Other means such as a snap ring 24b may also be used for this purpose.

In the constant speed drive and starter mechanism, second sets of planet gears 26 are also provided. These planet gears are also supported for rotary movement in the carrier 21, which in turn is connected by splines 27 with the engine shaft 28. This arrangement provides for direct transmission of motion from the carrier 21 to the engine shaft during the engine starting operation and from the engine to the planet carrier after the engine has reached self-sustaining speed. The planet carrier is suitably journalled in bearings 30 mounted in a wall forming a part of the housing 12. The carrier may also be supported for rotation by other bearings 31 in the motor casing 11. The second sets of planet gears 26 have a gear 32 in meshing engagement with the second row 23c of teeth in the ring gear assembly 23, the gears 32 being connected for rotation with gears 33 of the planet sets 26. Gears 33 mesh with a pinion 34 which is suitably connected with the rotor of an alternator (not shown). The present invention is directed primarily to the ring gear assembly 23 and ratchet ring 24.

The constant speed and starter mechanism has been described to the extent necessary for an understanding of the invention. Further description thereof is believed to be unnecessary at this time. Reference to the patents mentioned above will disclose the operation of the constant speed drive and starter, it being sufficient herein to state that when the turbine 15 revolves, due to the application of fluid under pressure to the turbine wheel blades, rotary motion will be transmitted from the pinion 18 to the sets 20 of planet gears and from the spur gears 22 thereon to the ring gear 23.

Normally, when the device is at rest or is not in actual operation, each of a plurality of pawls 35 pivotally supported on the ring gear assembly, as at 35a, will have an end 36 thereof resiliently held in engagement with teeth 37 of ratchet ring 24 by springs 38. This engagement will prevent the ring gear from rotating in one direction and cause planet gears 22 to react with and roll around the ring gear, imparting rotary motion to the planet carrier 21. This motion of the planet carrier is transmitted directly to the engine shaft to start the engine. After the engine has reached a predetermined speed, fuel will be supplied thereto and ignited to start the engine. When the engine has reached self-sustaining speed, the flow of air or other operating fluid to the turbine will be modified to cause the turbine wheel 15 to operate at the rate necessary to maintain a predetermined speed of the alternator.

A review of the previously mentioned patents will disclose that operation of the engine transmits motion through the planet carrier and the planet gears to the ring gear. Rotary movement of the ring gear, in turn, transmits motion through the second set of planets to the pinion 34, which in turn drives the alternator. It will be obvious that during the starting operation the planet carrier 21 is revolved and gears 32 of the second set of planets 26 will react with the second row 23c of teeth on the ring gear assembly to transmit rotary motion to the alternator; the latter, however, will be unloaded through suitable switch mechanism at this time. After the engine reaches self-sustaining speed, the switch mechanism may be operated to connect the alternator in a circuit for utilizing the energy.

Figure 4:
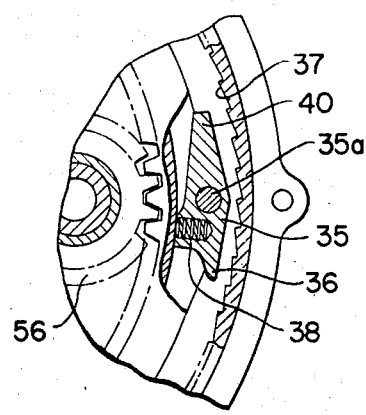
FIG. 4 is a fragmentary sectional view similar to FIG. 3 showing the direction limiting means in another phase of operation.

As previously mentioned, the constant speed drive and starter mechanism functions, after the engine reaches self-sustaining speed, to trim the speed of the alternator (by adjusting the rate of the turbine 15) and maintain it at a constant rate of operation. When the engine reaches self-sustaining speed, a sensor (not shown) of the alternator speed adjusts the inlet vanes 13 of the turbine to effect controlled operation of the turbine 15. The transmission of torque by the engine shaft and the turbine to the planetary gears may cause the ring gear to rotate in the direction necessary to effect the alternator speed trimming operation. The pawl and ratchet mechanism permits rotation of the ring gear in this direction. The mechanism has been so designed that when the alternator approaches the required speed, the ring gear will be rotating at a speed sufficient to permit weighted ends 40 of the pawls 35 to move outwardly under centrifugal force to withdraw the ends 36 from engagement with the ratchet teeth (see FIG. 4). Wear and tear on this part of the mechanism, together with noise, will thus be avoided. If for any reason the planet carrier (or engine) speed should be reduced below a predetermined rate sufficient to reduce the speed of the ring gear, springs 38 will move the pawls 35 to cause a re-engagement of the ends 36 with the teeth 37 and prevent reverse rotation of the ring gear.

In FIG. 2 of the drawings, the invention is shown adapted to a plain air turbine starter. The mechanism of the invention in this adaption is substantially the same as in the first form of the invention. The air turbine starter 41 in FIG. 2 includes a casing 42 having a turbine 43 journalled in bearings 44 therein. An air passage 45 supplies air through suitable nozzle vanes 46 to the blades 47 of the turbine 43 to effect rotation thereof. This rotary motion is transmitted by a pinion 48 to spur gears 50 mounted for rotation about stationary axes 51 in casing 42. Gears 50 mesh with a ring gear 52 carried by a shaft 53 supported for rotation in bearings 54. This shaft has a pinion 55, which in turn meshes with planet gears 56 journalled on a carrier 57 forming a part of output shaft 58. The planet gears 56 mesh with an internal ring gear 60 which is supported for rotary movement in a ratchet ring 61, this member being stationarily supported in the casing 42. As in the form of the invention previously described, the ratchet ring has a flange 62 clamped between parts of casing 42 to hold the ratchet ring stationary. Also, as in the first form of the invention described, the ratchet ring has teeth 37 formed thereon for engagement by ends 36 of pawls 35 pivotally supported, as at 35a, on the ring gear assembly 60. The ends 36 are urged into engagement with the teeth 37 by springs 38 so that the ring gear assembly will normally be restrained against rotation in one direction. In this form of the invention, rotary motion of the turbine transmits motion through the pinion 48, gears 50, ring gear 52, and pinion 55 to planet gears 56. Rotation of these elements will cause a reaction with the ring gear 60, revolving the carrier 57 and output shaft 58. This motion of the shaft 58 may be transferred by suitable mechanism to the engine to be started.

In some instances, one form of such mechanism may be a gear train (not shown) forming a part of an accessory drive system which is operated in some instances by the turbine 43 to effect the operation of alternators, hydraulic pumps, and any other desired mechanism. Such mechanism may also be driven through the accessory drive system by the engine after it has been started by the turbine 43.

Figure 3:
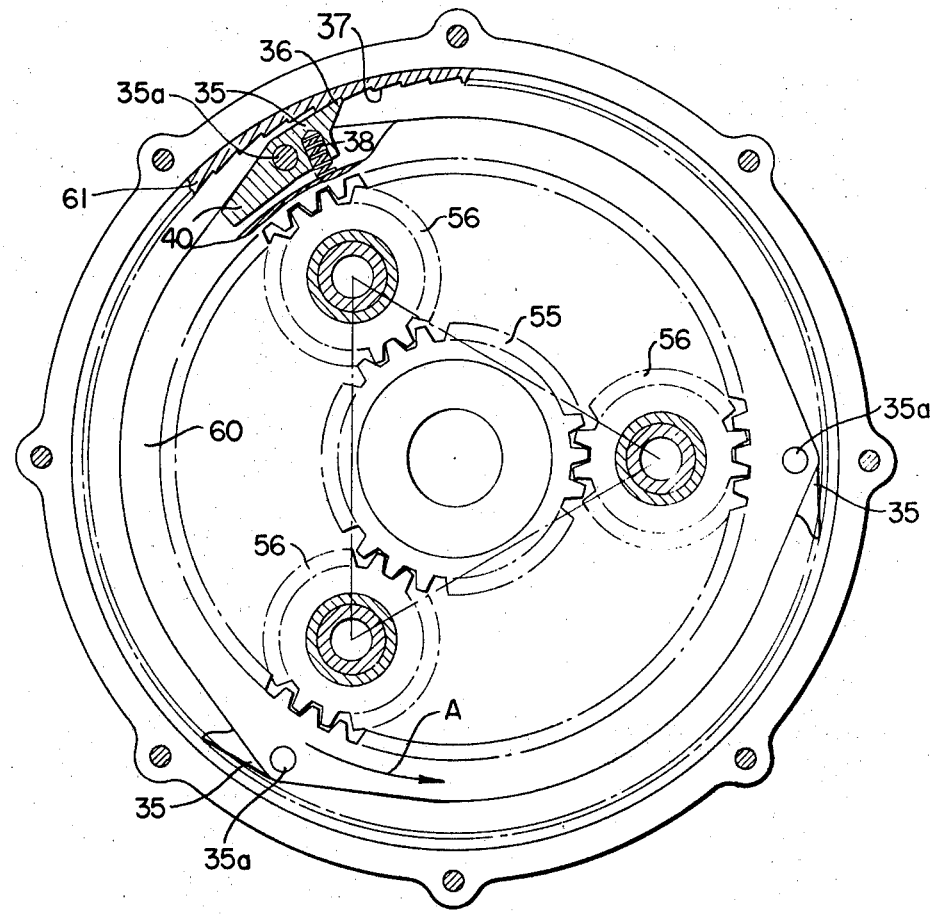
FIG. 3 is a vertical transverse sectional view taken through the starter on the plane indicated by line III—III of FIG. 2 and shows a rotary motion direction limiting means in one phase of operation.

When the engine has reached self-sustaining operation, the supply of air or other suitable fluid to the turbine may be discontinued and the turbine will then cease to apply driving torque. At this time, pinion 48, gears 50, 52 and 55 will exert no driving force and rotary motion transmitted by the engine to the output shaft 58 and carrier 57 will cause gears 56 to roll around gear 55. Gears 56 will also transmit motion to the ring gear assembly to cause it to revolve in the direction of the arrow A, shown in FIG. 3. This motion will, as previously pointed out, cause the weighted ends 40 of the pawls 35 to move outwardly under centrifugal force and withdraw the ends 36 from engagement with the ratchet teeth 37. In the event the engine should slow down below a predetermined speed of rotation, the springs 38 will move the ends 36 of the pawls back into engagement with the teeth 37 to prevent reverse rotation of the ring gear assembly. One of the features of the invention is that it permits the use of the starter to restart a windmilling engine without danger of damage to the engine or the starter.

Some advantages of the invention are that the mechanism embodying it permits starter engagement at speeds up to starter cutout speed. It eliminates the possibility of a reversed running engagement and resultant high impact torque that could shear the engine shaft. Also, driving engagement occurs at approximately zero r.p.m. clutch speed and is independent of engine speed. The mechanism also limits ratching, thus protecting the mechanism from wear and tear. In addition, the mechanism eliminates the requirement in the constant speed drive and starter of a start selector valve, a brake mechanism and actuator together with the brake pressure switch, a start cutout valve, and a switch. It also simplifies the control system.

Other advantages will be apparent from a study of the drawings and the foregoing description.

I claim:
1. Transmission means, comprising:
   (a) a relatively stationary structure;
   (b) a gear train for transmitting motion from a power source to a device to be driven, said gear train including a predetermined gear element; and
   (c) means carried in part by said predetermined gear element for engagement with said stationary structure in at least one stage of operation of said gear element to limit rotary movement thereof to a single direction, said means being so constructed and arranged that rotation of said gear element in excess of a predetermined rate prevents engagement of said means with said structure.

2. The transmission means of claim 1 in which said predetermined gear element consists of a ring gear.

3. The transmission means of claim 2 in which the means for limiting the direction of rotary movement of the ring gear comprises a pawl and ratchet means.

4. The transmission means of claim 3 in which the ratchet is secured to the stationary structure.

5. The transmission means of claim 4 in which the pawl elements of the pawl and ratchet means are carried by said ring gear element.

6. The transmission means of claim 5 in which resilient means engage the pawl and ring gear elements and tend to urge parts of the pawl elements toward said ratchet means.

7. The transmission means of claim 6 in which portions of said pawl elements are weighted to be responsive to centrifugal force to move the pawl elements in opposition to said resilient means.

8. The transmission means of claim 1 in which the gear train has an internal ring gear and the means for limiting the direction of rotary movement thereof has a ratchet ring surrounding said ring gear and secured to the stationary support, said ring gear carrying pivoted pawls for engagement with said ratchet to prevent said ring gear from rotating in one direction and permit rotary movement in the opposite direction.

9. The transmission means of claim 8 in which spring means tend to move portions of said pawls into engagement with said ratchet.

10. The transmission means of claim 9 in which said pawls are weighted on the opposite side of the pivots therefor from said spring means.

11. Transmission means for engine starting and accessory drive devices, comprising:
   (a) a gear train for transmitting motion from a power source to a device to be driven, said gear train including internal ring gear means meshing with a set of planet gears;
   (b) means for limiting the direction of rotary movement of said internal ring gear means, said limiting means having a ring with ratchet teeth surrounding said ring gear means and secured to a stationary support;
   (c) pawl means pivotally mounted on said ring gear means for movement into engagement with said ratchet teeth to limit the direction of movement of said ring gear means;
   (d) resilient means normally urging said pawl means toward engagement with said ratchet teeth; and
   (e) weight means on said pawl means for movement in response to centrifugal force to disengage said pawl means from said ratchet teeth and permit rotation of said ring gear means.

12. The transmission means of claim 11 in which the gear train has a sun gear meshing with said planet gears, said sun gear being connected with a second ring gear in meshing engagement with a second set of planet gears disposed for rotation about stationary axes and meshing with a second sun gear adapted to be driven by said power source, initial torque applied by said power source causing the revolution of the first-mentioned set of planet gears within said first-mentioned ring gear, the latter being held against rotation through the engagement of said pawls with said ratchet teeth.

13. The transmission means of claim 12 in which the first-mentioned set of planet gears is carried by means for transmitting motion from the transmission to the device to be driven, rotation of said motion-transmitting means beyond a predetermined rate serving to drive said first-mentioned ring gear at a speed sufficient to disengage said pawls from said ratchet teeth.

14. The transmission means of claim 13 in which reverse torque applied by said power source tends to hold said first-mentioned sun gear stationary and rotation of said motion-transmitting means causes the planet gears of said first-mentioned set to roll around said first-mentioned sun gear to drive said first-mentioned ring gear at a speed sufficient to disengage said pawls from said ratchet teeth.

15. The transmission means of claim 11 in which said internal ring gear means is of a dual type and meshes with a second set of planet gears, both sets of planet gears being carried by a support secured for rotation with an element to be driven by the power source through the transmission means, torque applied by said power source effecting the operation of said means for limiting the direction of rotation of said ring gear means, reverse torque applied by the driven element serving to drive said ring gear means at a speed sufficient to disengage said pawls from said ratchet teeth.

References Cited

UNITED STATES PATENTS

| | | | |
|---|---|---|---|
| 1,767,593 | 6/1930 | Laabs. | |
| 2,248,240 | 7/1941 | King | 74—785 X |
| 2,625,047 | 1/1953 | Wood | 74—785 X |
| 2,908,189 | 10/1959 | Parker et al. | 74—675 |
| 2,951,570 | 9/1960 | Antrim et al. | 192—48.6 X |
| 2,972,911 | 2/1961 | Volk et al. | 74—810 |
| 3,037,349 | 6/1962 | Gassmann | 74—785 X |
| 3,238,721 | 3/1966 | Brandes et al. | 60—39.14 X |
| 3,307,426 | 3/1967 | Whitaker | 74—675 |
| 3,362,256 | 1/1968 | Cluff et al. | 74—675 |

LEONARD H. GERIN, Primary Examiner

U.S. Cl. X.R.

60—39.14; 74—675, 810; 192—104